(12) United States Patent
Saily et al.

(10) Patent No.: US 11,265,843 B2
(45) Date of Patent: Mar. 1, 2022

(54) DATA ROUTING IN CELLULAR COMMUNICATION SYSTEM

(71) Applicant: NOKIA SOLUTIONS AND NETWORKS OY, Espoo (FI)

(72) Inventors: Mikko Saily, Laukkoski (FI); Sofonias Hailu, Espoo (FI)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 16/788,265

(22) Filed: Feb. 11, 2020

(65) Prior Publication Data
US 2020/0187153 A1     Jun. 11, 2020

Related U.S. Application Data

(62) Division of application No. 15/755,499, filed as application No. PCT/EP2015/069749 on Aug. 28, 2015, now abandoned.

(51) Int. Cl.
*H04W 68/00* (2009.01)
*H04W 76/10* (2018.01)
*H04W 88/02* (2009.01)

(52) U.S. Cl.
CPC ......... *H04W 68/005* (2013.01); *H04W 76/10* (2018.02); *H04W 88/02* (2013.01)

(58) Field of Classification Search
CPC ..... H04W 68/005; H04W 76/28; H04W 4/70; H04W 8/08; H04W 68/02; H04W 76/27; H04W 76/10; H04W 88/02; H04W 76/11; H04W 4/029; H04W 72/042; H04W 8/005; H04W 64/003
See application file for complete search history.

(56) References Cited

U.S. PATENT DOCUMENTS

2011/0117876 A1    5/2011  Xu et al.
2013/0316706 A1*  11/2013  Knauft ............... H04W 68/04
                                                455/435.1

(Continued)

FOREIGN PATENT DOCUMENTS

| CN | 102939789 A | 2/2013 |
| CN | 103348748 A | 10/2013 |
| CN | 103563440 A | 2/2014 |

OTHER PUBLICATIONS

Office Action for European Application No. 15756902.1, dated May 6, 2020, 4 pages.

(Continued)

*Primary Examiner* — Allahyar Kasraian
(74) *Attorney, Agent, or Firm* — Brake Hughes Bellermann LLP

(57) ABSTRACT

There is provided a solution for proactively transferring downlink data addressed to a terminal device from a data routing network element of a cellular communication system. According to an embodiment, a location of the terminal device is determined and an identifier associated with the determined location is delivered to the data routing network element. Then, the data routing network element may forward the downlink data towards the terminal device even before one or more services for the delivery of the downlink data to the terminal device have been completed.

12 Claims, 11 Drawing Sheets

(56) References Cited

U.S. PATENT DOCUMENTS

| | | | | |
|---|---|---|---|---|
| 2014/0004850 A1* | 1/2014 | Kwon | ................... | H04W 68/02 |
| | | | | 455/423 |
| 2014/0126489 A1 | 5/2014 | Zakrzewski | | |
| 2014/0204926 A1 | 7/2014 | Ota et al. | | |
| 2014/0341038 A1 | 11/2014 | Lim | | |
| 2018/0124741 A1* | 5/2018 | Lu | ....................... | H04W 68/005 |

OTHER PUBLICATIONS

Office Action for Chinese Application No. 201580084160.1, dated Aug. 17, 2020, 10 pages.

3GPP TSG-RAN WG2 Meeting #82, R2-131708; "Summary of email discussion [81bis#15] [Joint/MTCe] Initial qualitative analysis of the proposed solutions for SDDTE", Fukuoka, Japan; May 20-24, 2013, 27 pages.

International Search Report and Written Opinion for International Application No. PCT/EP2015/069749 , dated Aug. 16, 2016 (15 pages).

3rd Generation Partnership Project; Technical Specification Group Services and System Aspects; Architecture enhancements for Cellular Internet of Things; (Release 13); 3GPP TR 23.720 V 0.1.0 (Jul. 2015); Sophia Antipolis, France (54 pages).

ZTE Corporation; Summary of email discussion [81bis#15] [Joint/MTce] initial qualitative analysis of the proposed solutions for SDDTE; 3GPP TSG-RAN WG2 Meeting #82, Furuoka, Japan, May 20-24, 2013 (27 pages).

U.S. Appl. No. 15/755,499, filed Feb. 26, 2018, Pending.

Office Action for Chinese Application No. 201580084160.1, dated Mar. 3, 2021, 5 pages.

Office Action for Chinese Application No. 201580084160.1, dated Aug. 3, 2021, 4 pages.

* cited by examiner

DATA ROUTING IN CELLULAR COMMUNICATION SYSTEM

CROSS-REFERENCE TO RELATED APPLICATIONS

This application is a divisional of U.S. application Ser. No. 15/755,499, filed Feb. 26, 2018, entitled "DATA ROUTING IN CELLULAR COMMUNICATION SYSTEM" which is a national stage entry of International Application No. PCT/EP2015/069749, filed Aug. 28, 2015, entitled "DATA ROUTING IN CELLULAR COMMUNICATION SYSTEM" which are hereby incorporated by reference in their entireties.

TECHNICAL FIELD

The invention relates to wireless communications in a cellular communication system.

BACKGROUND

Increasing demand for wireless communication services is constantly increasing and, as a result, traffic in cellular communication systems is also increasing. Optimization of performance of cellular communications is under constant development, and new evolution versions of cellular communication systems are designed.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF THE DRAWINGS

In the following embodiments will be described in greater detail with reference to the attached drawings, in which.

DETAILED DESCRIPTION OF SOME EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and/or 5G system. The present embodiments are not, however, limited to these systems.

The embodiments are not, however, restricted to the system given as an example but a person skilled in the art may apply the solution to other communication systems provided with necessary properties. One example of a suitable communications system is the 5G concept, as listed above. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates. 5G will likely be comprised of more than one radio access technology (RAT), each optimized for certain use cases and/or spectrum.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

Figure 1:
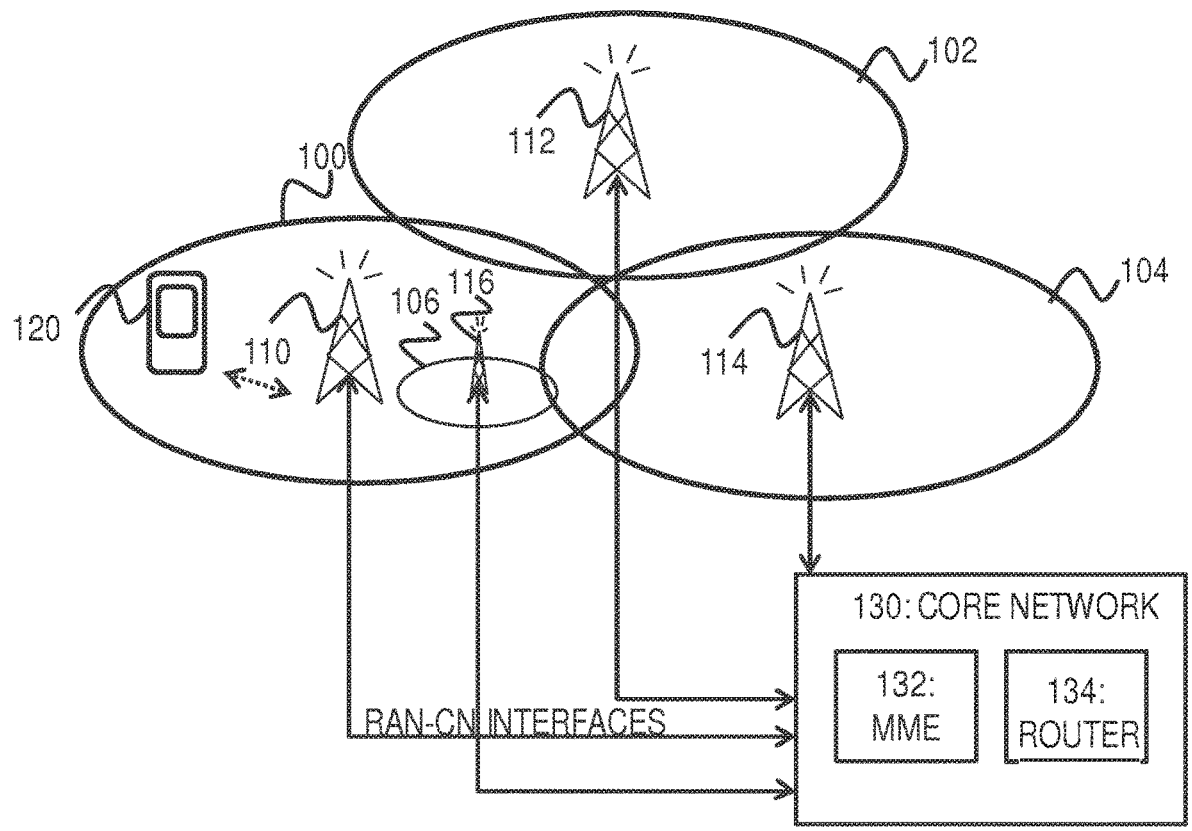
FIG. 1 illustrates an example of a wireless communication system to which embodiments of the invention may be applied.

FIG. 1 illustrates an example of a cellular communication system to which embodiments of the invention may be applied. Cellular radio communication networks, such as the Long Term Evolution (LTE), the LTE-Advanced (LTE-A) of the 3rd Generation Partnership Project (3GPP), or the predicted future 5G solutions, are typically composed of at least one network element, such as a network element 110, providing a cell 100. Each cell may be, e.g., a macro cell, a micro cell, femto, or a pico-cell, for example. The network element 110 may be an evolved Node B (eNB) as in the LTE and LTE-A, a radio network controller (RNC) as in the UMTS, a base station controller (BSC) as in the GSM/GERAN, or any other apparatus capable of controlling radio communication and managing radio resources within a cell. For 5G solutions, the implementation may be similar to LTE-A, as described above. The network element 110 may be a base station. The cellular communication system may be composed of a radio access network of network elements 110, 112, 114, e.g. eNBs, each controlling a respective cell or cells 100, 102, 104. The network elements 110 to 114 may each control a macro cell 100 to 104 providing wide area coverage for terminal devices 120. The network elements 110 to 114 may also be called access nodes because they provide the terminal devices 120 with wireless access to other networks such as the Internet. Additionally, one or more local area access nodes 116 may be arranged within a control area of a network element 110, 112, 114 controlling a macro cell, 100 to 104. The local area access node 116 may provide wireless access within a sub-cell 106 that may be comprised within a macro cell 100. Examples of the sub-cell may include a micro, pico and/or femto cell. Typically, the sub cell provides a hot spot within a macro cell. The operation of the local area access node 116 may be controlled by a network element 110 under whose control area the sub-cell is provided. The network element 110 and the other network elements 112 to 116 may support Dual Connectivity (DC) in which the terminal device 120 has established multiple radio resource control (RRC) connections with the radio access network comprising the network elements 110 to 116. The terminal device 120 may establish one RRC connection with the network element 110 and another RRC connection with the local area access node 116 for improved performance of communications.

In the case of multiple eNBs in the communication network, the eNBs may be connected to each other with an X2 interface as specified in the LTE. Other communication methods between the network elements may also be possible. The network elements 110 to 116 may be further connected via a core network interface to a core network 130 of the cellular communication system. In an embodiment applied to the LTE system, the core network 130 may be called Evolved Packet Core (EPC). The core network 130 may comprise a mobility management entity (MME) 132 and a data routing network element 134. In the context of the LTE, the MME tracks mobility of the terminal devices 120 and carries out establishment of bearer services between the terminal devices 120 and the core network 130. In the context of the LTE, the data routing network element may be called a System Architecture Evolution Gateway (SAE-GW). It may be configured to carry out packet routing to/from the terminal devices 120 from/to other parts of the cellular communication system and to other systems or networks, e.g. the Internet.

The radio system of FIG. 1 may support Machine Type Communication (MTC). MTC may enable providing service for a large amount of MTC capable devices, such as the at least one terminal device 120. The at least one terminal device 120 may comprise mobile phones, smart phones, tablet computers, laptops and other devices used for user communication with the radio communication network, such as a MTC network. These devices may provide further functionality compared to the MTC scheme, such as communication link for voice, video and/or data transfer. However, in MTC perspective the at least one terminal device 120 may be understood as a MTC device. It needs to be understood that the at least one terminal device 120 may also comprise another MTC capable device, such as a sensor device providing position, acceleration and/or temperature information to name a few examples.

In MTC, the radio communication network may need to handle a massive amount of uncoordinated accesses by the MTC devices. As the amount of MTC devices may be quite high, network access may be a limiting factor, compared to the conventional network limitations, where interference and/or limited coverage may pose a problem. Most of the MTC devices may have a small amount of data to be transmitted in sporadic fashion. This may enable the MTC devices to spend majority of time in sleep mode, disconnected from the network element 110 to 116 and/or the cellular communication network. Thus, the MTC devices may have a requirement of very small energy consumption. However, the sporadic transmissions may cause the MTC devices to transmit an increased amount of random access requests per device to the network element 110 to 116, as each data packet transmission may be preceded by a random access procedure. Combined with the massive number of MTC devices, increase of random access requests in the cells 100 to 106 may be inevitable.

The random access procedure may comprise: transmitting, by the terminal device 120, a Random Access Preamble (RAP) to the network element 110. The network element 110 may respond with a Random Access Response (RAR) to the terminal device 120. The RAR may include an information element scheduling an uplink transmission resource for the terminal device 120. The terminal device 120 may then transmit a first scheduled transmission to the network element 110 in the scheduled uplink transmission resource. The network element 110 may respond to the first scheduled transmission with a contention resolution to the terminal device 120.

With respect to the core network, the MME 132 may be configured to control communication between the terminal device 120 and the core network 130. The MME 132 may track mobility of an idle-mode terminal device 120 within a tracking area and control paging of the terminal device 120 when there is downlink data for the terminal device, for example. The paging may be defined as calling for the terminal device to start bidirectional communication between the terminal device and the network element 110 and/or the MME 132. The paging may be defined as a connection request for establishment of a connection or a bearer service for the terminal device but, in some embodiments, the paging may be used to establish connectionless bidirectional communication link between the terminal device and the radio access network or the core network of the cellular communication system. The MME 132 may also carry out authentication of the terminal device in connection with establishing a communication connection for data transfer between the terminal device 120 and the core network 130. The MME 132 may also carry out allocation of temporary identifiers and security keys to the terminal device 120.

The data routing network element (SAE-GW or S-GW) 134 may route and forward user data packets of the terminal device 120. Upon receiving downlink data for the terminal device 120, the S-GW 134 may trigger paging of the terminal device, as described below. In a conventional system, the S-GW has to buffer the downlink data until the terminal device 120 has been successfully paged and a radio resource control (RRC) connection between the terminal device 120 and the network element 110 has been fully configured for the downlink data transmission. It means that the terminal device 120 has to be attached to the core network, e.g. by establishing a bearer between the terminal device 120 and the S-GW. The establishment of the bearer service may comprise configuring security parameters for the bearer service, which requires reconfiguration of an RRC connection between the network element 110 and the terminal device 120.

Figure 2:
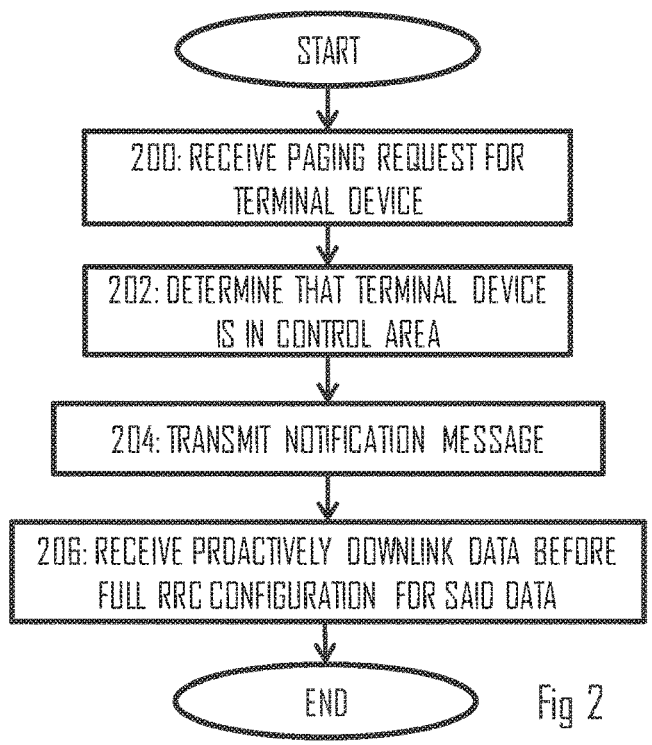
FIGS. 2 to 4 illustrate processes for carrying out proactive data forwarding according to some embodiments of the invention.
Figure 3:
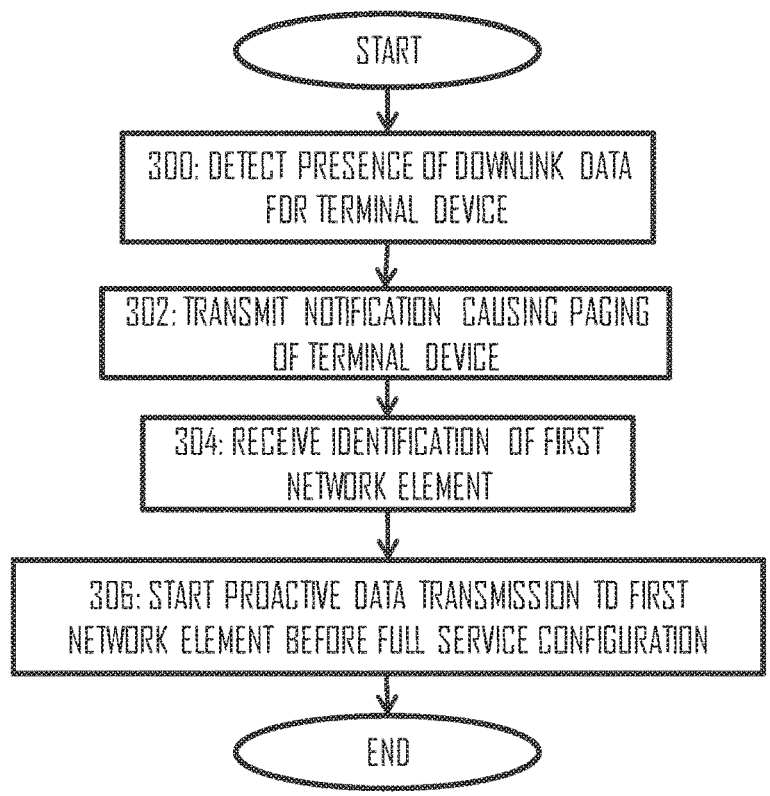
Figure 4:
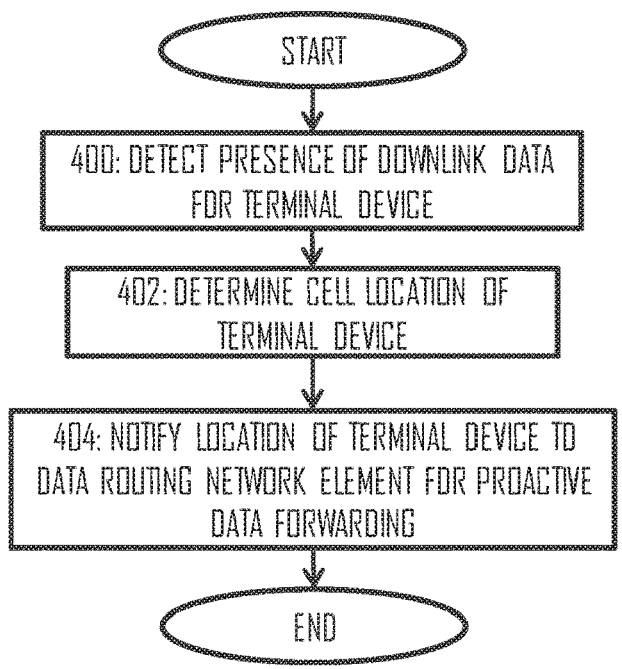

Some embodiments of the invention configure proactive data forwarding from the data routing network element 134 or another data routing network element towards the terminal device 120 as soon as the data routing network element receives an indication of a cell or a control area of a network element where the terminal device has been successfully paged. As there is no need to wait for the full establishment of the bearer service between the data routing network element and the terminal device before routing the data, latency in the data routing may be reduced and less memory capacity is consumed in the data routing network element. FIGS. 2, 3, and 4 illustrate some embodiments of the proactive data forwarding from the viewpoint of the network element 110, the data routing network element (e.g. the S-GW 134), and the network element controlling the paging of the terminal device 120 such as the MME 132, respectively.

It should be appreciated that while embodiments described below comprise a first network element (e.g. the network element 110), a second network element (e.g. the MME 132), and the data routing network element 134, it should be appreciated that these elements are interpreted as logical entities. In some implementations such as the LTE, these elements are typically also physically separate entities represented by different physical components. In other embodiments, at least some of the logical operations described below may be carried out by the same physical apparatus or a system, e.g. a computer system such as a server computer. For example, the physical apparatus may carry out the functions of the first network element 110 and the second network element 132, or the functions of the data routing network element 134 and the second network element 132, or even the functions of all three elements 110, 132, 134. In such embodiments, the signaling between the elements may be considered as signaling within the physical apparatus, e.g. signaling between different computer program processes executed in the same physical apparatus.

Referring to FIG. 2, let us describe a process for enabling proactive data forwarding in a network element, e.g. one of the network elements 110 to 116. Let us denote the network element executing the process as a first network element. Accordingly, the process comprises in the first network element: receiving (block 200), in the first network element from a second network element, a paging request for a terminal device, e.g. the terminal device 120. In response to receiving the paging request, the first network element determines whether or not the terminal device is located in a control area of the first network element (block 202), the control area comprising at least one cell of the cellular communication system. Upon determining that the terminal device is located in the control area, the first network element causes in block 204 transmission of a notification message to the second network element. After transmission of the notification message and before a service for the terminal device has been fully configured for data transmission, the first network element receives downlink payload data associated with the service (block 206).

Referring to FIG. 3, let us describe a process for carrying out proactive data forwarding in a data routing network element 134, e.g. the S-GW. The process comprises detecting, in the data routing network element, that downlink data addressed to a terminal device of the cellular communication system exists (block 300). In response to said detecting, the data routing network element causes transmission of a notification message causing paging of the terminal device (block 302). As a response to the notification message, the data routing network element receives a response notification message identifying a first network element 110 controlling a control area comprising at least one cell (block 304). The first network element may be the first network element executing the process of FIG. 2, and the first network element may be a network element in whose control area the terminal device has been successfully paged.

In block 306, the data routing network element causes, on the basis of the received response, transmission of said downlink data to the first network element before a service between the terminal device and the data routing network element and associated with said downlink data has been fully configured.

Referring to FIG. 4, let us describe a process for enabling proactive data forwarding in a network element, e.g. the MME 132. The network element carrying out the process of FIG. 4 may be the second network element mentioned above. The network element detects in block 400 that downlink data addressed to a terminal device of the cellular communication system exists.

In an embodiment, the detection is based on receiving the notification message from the data routing network element, e.g. the S-GW 134.

In response to said detecting, the network element determines a cell where the terminal device is located. Below, some embodiments for determining are described.

Upon determining the cell, the network element causes transmission of a notification message to the data routing network element of the cellular communication system, wherein the notification message is transmitted before a service associated with said downlink data has been fully configured with the terminal device.

In an embodiment, the service comprises a radio resource connection established between the terminal device and the first network element.

In an embodiment, the service comprises a bearer service established between the data routing network element and the terminal device for transmission of the downlink data. Establishment of the bearer service may comprise establishing a data tunnel between the terminal device and the data routing network element.

In an embodiment, the service encompasses the bearer service and the radio resource connection.

According to another aspect, the first network element of the cellular communication system may carry out a process comprising: maintaining, by the first network element, cell-level locations of terminal devices located in a control area of the first network element, a cell level location associating a location of a terminal device to a cell of the control area; receiving, in the first network element from a second network element, a paging request for the terminal device; in response to receiving the paging request and upon determining that the terminal device is located in the control area of the first network element, causing transmission of a notification message to the second network element; and after transmission of the notification message, receiving in the first network element payload data addressed to the terminal device.

According to this aspect, the data routing network element may carry out a process comprising: detecting, in the data routing network element of the cellular communication system, that downlink data addressed to a terminal device of the cellular communication system exists; in response to said detecting, causing in the data routing network element transmission of a notification message causing paging of the terminal device; as a response to the notification message, receiving in the data routing network element a response notification message identifying an access node controlling a control area comprising at least one cell; and causing, in the data routing network element on the basis of the received response, transmission of said downlink data to the first network element.

Yet according to this aspect, a network element of the cellular communication system may carry out a process comprising: maintaining, by the network element of the cellular communication system, cell-level locations of terminal devices located in a tracking area of the network element, a cell level location associating a location of a terminal device to a cell of the tracking area, the tracking area comprising a plurality of cells; detecting, in the network element, that downlink data addressed to the terminal device of the cellular communication system exists; in response to said detecting, determining in the network element an access node associated with the cell where the terminal device is located; upon determining the first network element, causing by the network element transmission of a notification message to a data routing network element of the cellular communication system, the notification message indicating the first network element controlling the cell and, further upon determining the access node, causing transmission of a paging message to the access node to page for the terminal device.

Let us now describe some embodiments of the processes of FIGS. 2 to 4 with reference to signalling diagrams 5 to 12 that illustrate signalling and cooperation between network element carrying out the above-described processes.

Figure 5:
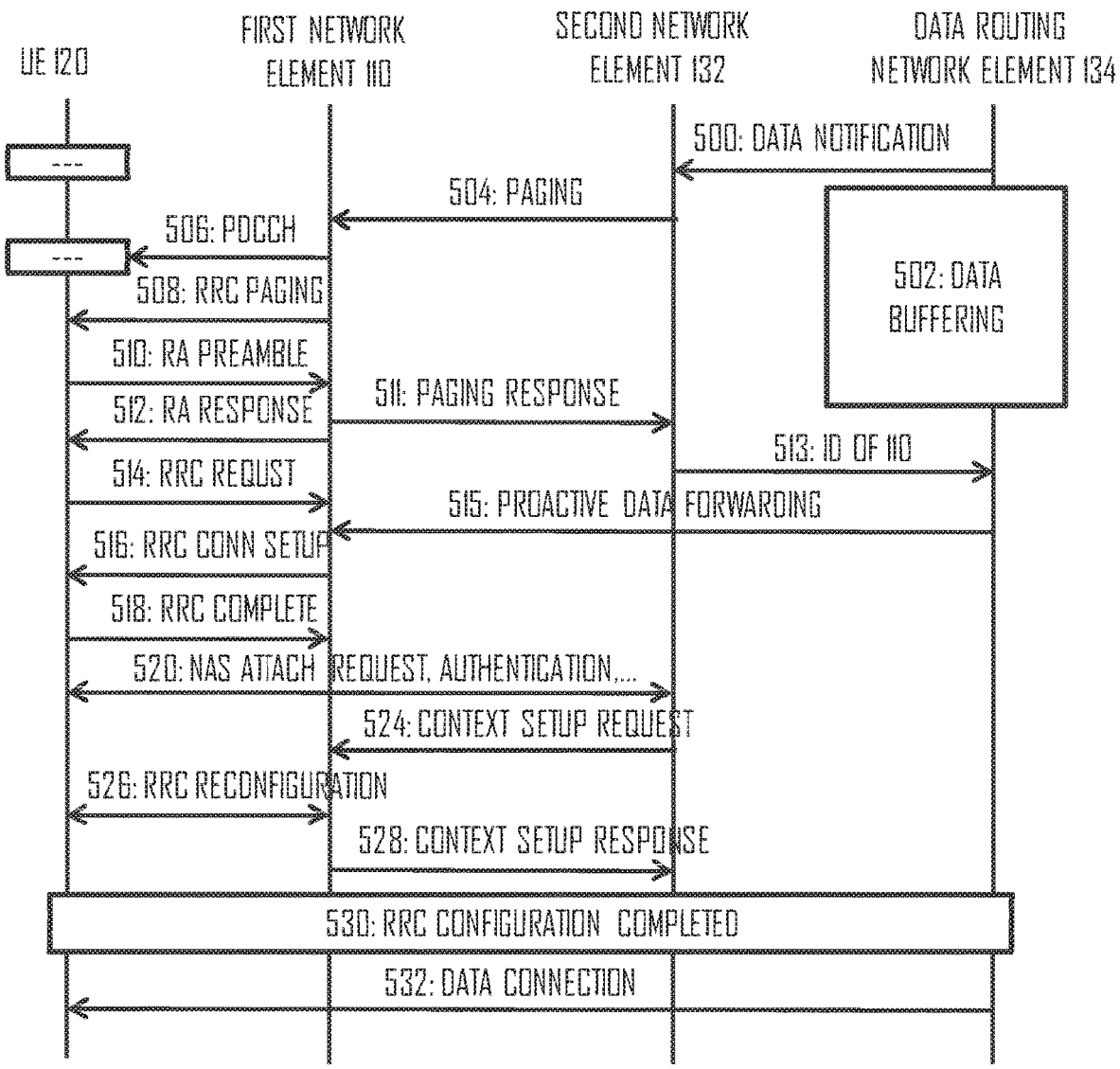
FIG. 5 illustrates a signaling diagram for carrying out proactive data forwarding according to an embodiment of the invention.

FIG. 5 illustrates a signalling diagram comprising signalling between the terminal device (UE) 120 and the network elements according an embodiment of the invention. FIG. 5 illustrates an embodiment described in the context of an LTE system but the disclosure can be adapted to other cellular communication systems in a straightforward manner. Referring to FIG. 5, upon detecting (in block 300) presence of downlink data for the UE 120, the data routing network element 134 sends the notification message to the second network element 132 in step 500. The detection may be based on receiving data addressed to the UE 120 in the data routing network element 134.

Reception of the notification message causes the second network element 132 to page for the UE 120 in an area where the second network element 132 has tracked the UE 120 to be located. The paging may be carried out by transmitting the paging request to at least one access node 110 to 116, e.g. at least to the first network element operating functions of the access node. In an embodiment, the area is a tracking area of the LTE, comprising a plurality of cells. Accordingly, the second network element 132 may send the paging request (step 504) to all access nodes in the tracking area. Below, other embodiments are also disclosed.

Reception of the paging request in step 504 causes the first network element 110 to start paging for the UE 120 in at least one cell controlled by the first network element 110. Boxes denoted in FIG. 5 by "- - -" illustrate paging occasions when the terminal device listens to a control channel, e.g. a physical downlink control channel (PDCCH) for an identifier of the UE 120, e.g. a physical layer radio network temporary identifier (P-RNTI), a globally unique temporary identifier (GUTI) or a SAE-Temporary Mobile Subscriber Identity (S-TMSI). When paging for the UE 120, the first network element may add the P-RNTI, the GUTI or the S-TMSI of the UE 120 to a signal of the PDCCH in step 506. Upon detecting its identifier on the PDCCH, the UE 120 determines a physical downlink shared channel (PDSCH) resource conveying the paging message from the first network element 110 (step 508). The PDSCH resource may be indicated on the PDCCH in association with the P-RNTI/GUTI/S-TMSI. Upon detecting the paging request in step 508, the UE 120 may start a random access procedure to establish an RRC connection with the first network element 110. The random access procedure may comprise the UE 120 transmitting a random access preamble on an uplink random access channel (RACH) (Step 510).

Upon receiving the random access preamble, or another first message from the terminal device after paging for the terminal device, the first network element 110 may determine that it has discovered the UE 120 and, as a consequence, the first network element 110 may transmit (step 511) a paging response message to the second network element 132 to indicate that the UE 120 has been discovered. Upon receiving the paging response from the first network element 110 in step 511, the second network element 132 determines that the UE 120 has been detected by the first network element and, as a consequence, the second network element 132 transmits (step 513) a response to the data notification message of step 500 to the data routing network element 134. The response may comprise an identifier of the first network element 110 that reported detection of the UE 120. Between steps 500 and 513, the data routing network element 134 may have buffered the downlink data destined to the UE 120.

Upon receiving the response in step 513 and determining the identifier of the first network element 110 from the received response, the data routing network element 134 may start the transmission of the downlink data to the first network element (step 515).

While the first network element 110 receives proactively downlink data from the data routing network element 134 in step 515 and buffers the data, the RRC connection between the first network element 110 and the UE 120 and/or a bearer service between the UE 120 and the data routing network element 134 may be under configuration. Referring to the random access procedure, the first network element 110 may respond to the random access preamble with a random access response message in step 512. The random access response may indicate to the UE 120 that the first network element 110 has received the preamble and indication of a radio resource for the UE 120. Upon receiving the response in step 512, the UE 120 may request for the RRC connection by transmitting in step 514 a RRC connection request message in the radio resource indicated in the response of step 512. The RRC connection request may comprise an identifier of the UE 120, e.g. the S-TMSI, GUTI or cellular-RNTI. Upon receiving the RRC connection request in step 514, the first network element 110 may establish radio bearer(s) necessary for the RRC connection, e.g. signaling radio bearer(s) and data radio bearer(s) and indicate corresponding parameters to the UE 120 in a RRC connection setup message in step 516. Upon receiving the RRC connection setup message in step 516, the terminal device may configure the radio bearers for the RRC connection and acknowledge initial RRC connection completion to the first network element with an RRC complete message transmitted from the UE 120 to the first network element 110 in step 518.

While the radio bearers of the RRC connection are now configured for the connection, the RRC needs to be further configured before it is fully configured for data transmission. The UE 120 has yet to establish bearers with the core network by attaching to the core network. The attach procedure may be carried out by the UE 120 transmitting a non-access stratum (NAS) attach request to the second network element 132 in step 520. The attach procedure may also comprise authentication of the UE 120. When establishing the bearers between the UE 120 and the core network, the second network element may request for setup of UE's 120 context in the first network element 110 and the data routing network element 134. In step 524, the second network element 132 transmits a context setup request to the first network element 110, wherein the request may comprise context parameters such as security context information for the UE 120 (e.g. security key(s) used to encrypt messages) and bearer identifier of the UE 120 for the bearer(s) established between the UE 120 and the core network.

Upon receiving the context setup request in step 524, the first network element 110 may reconfigure the RRC connection with the UE 120 on the basis of the received context parameters in step 526. Upon reconfiguring the RRC connection, the first network element may respond to the second network element 132 that the context of the UE 120 has been established and the bearer services and the RRC have been configured for the data transmission (step 528). Thereafter, the RRC between the first network element 110 and the UE 120 and the bearer service(s) between the UE 120 and the core network 130 may be considered as being fully configured and ready for data transmission (block 530), and a data connection between the UE 120 and the data routing network element 134 is ready for the data transfer. At this point, the first network element 110 may transmit the buffered downlink data it has proactively received to the UE 120. Thereafter, data may be transferred between the data routing network element 134 and the UE 120 in a conventional manner (step 532).

FIG. 5 illustrates an advantage of the present invention: according to the conventional solution the data routing network element 134 would be able to transmit downlink data to the first network element 110 only in step 532, while the present invention enables transmission of downlink data addressed to the UE 120 between the data routing network element 134 and the first network element as early as in step 515. Since the downlink data is readily closer to the UE 120 when the RRC configuration has been completed (block 530), data can be delivered to the UE 120 earlier which reduces latency of the data transmission.

According to a conventional solution, the second network element 132 tracks the location of the UE 120 in a tracking area comprising multiple cells and multiple access nodes providing the cells. This is typical for an UE 120 in an idle mode or in a mode that is similar to the idle mode in the sense that the exact cell-level location is not available to the second network element 132. Therefore, the second network element 132 may need to page for the terminal device in the tracking area and wait until it receives a response to the paging request from an access node before it is able to determine the cell-level location of the UE 120 and before it is able to indicate to the data routing network element 134 the identifier of the access node that received the paging response from the UE.

Figure 6:
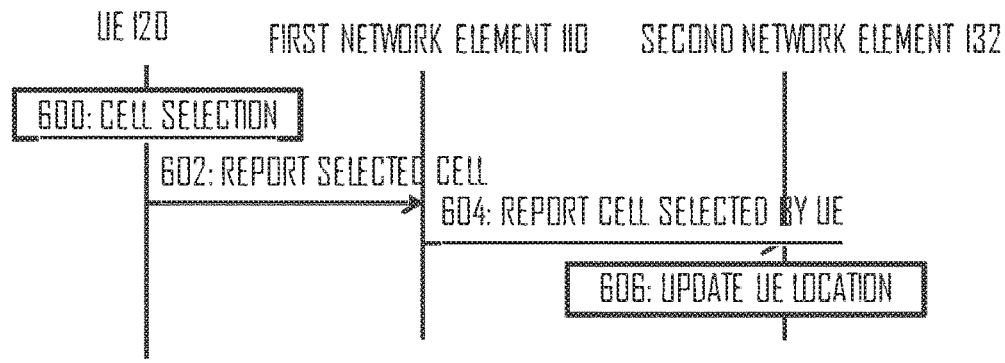
FIG. 6 illustrates a process for tracking location of a terminal device according to an embodiment of the invention.

According to an embodiment, the UE 120 may be configured to report a cell it has selected in a cell selection process to the first network element. The cell selection process may refer to an idle mode cell selection or another type of cell selection where the terminal device is able to select a cell in which it chooses to communicate with the radio access network. FIG. 6 illustrates such a process for reporting the selected cell to the radio access network. Referring to FIG. 6, the UE 120 performs cell selection in block 600. The cell selection as such may be according to a conventional technique, e.g. the UE 120 may select a cell that is from a network acceptable for the UE 120, that is detectable by the UE 120 (sufficient signal level at the UE), and/or that provides services that the UE 120 requires. In step 602, the UE indicates the cell selection to an access node, e.g. the first network element 110 providing the selected cell. The indication in step 602 may be carried out through a random access procedure, as described below. The indication may comprise an identifier of the UE 120, e.g. the S-TMSI or GUTI. Upon receiving the report from the UE 120 in step 602, the first network element may report the cell selection of the UE 120 to the second network element 132 in step 604. The report in step 604 may comprise at least the identifier of the UE 120 and an identifier of the first network element 110. Upon receiving the report in step 604, the second network element 132 may update the location of the UE (block 606) by updating a location database stored in the second network element. The updated location database may associate the identifiers of the UE 120 and the first network element 110 to indicate that the UE 120 has currently selected the first network element 110.

Figure 7:
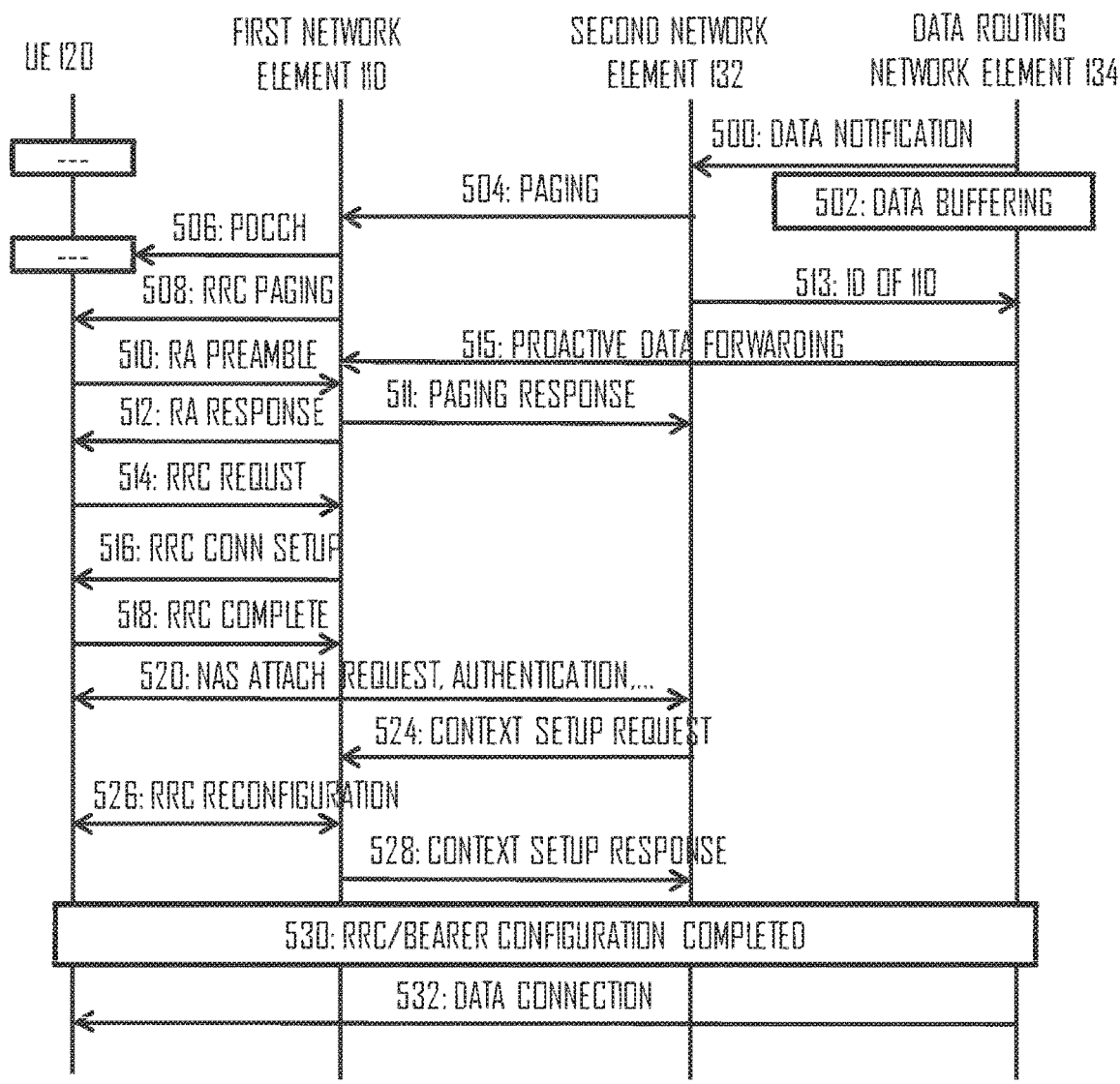
FIG. 7 illustrates another signaling diagram for carrying out proactive data forwarding according to another embodiment of the invention.

Using the reporting of FIG. 6 enables modification of the process of FIG. 5 into a form illustrated in FIG. 7. The steps denoted with the same reference numbers as in FIG. 5 represent the same or substantially similar steps. As can be seen when comparing the embodiments of FIGS. 5 and 7, the second network element 132 is able to carry out step 513 earlier in FIG. 7 than in FIG. 5. In other words, as the second network element 132 stores the location of the UE on the cell level, it is able to respond to the data notification message of step 500 as soon as it has retrieved the current cell of the UE 120 from the location database. The second network element 132 may thus transmit the identifier of the first network element to the data routing network element (step 513) before it receives the paging response from the first network element in step 511, and the data routing network element 134 may start the proactive data forwarding (step 515) to the first network element even before the first network element 110 has received a paging response from the UE 120 (step 510) or transmitted the paging response to the second network element 132 (step 511). Otherwise, the process may be similar to that of FIG. 5.

Figure 8:
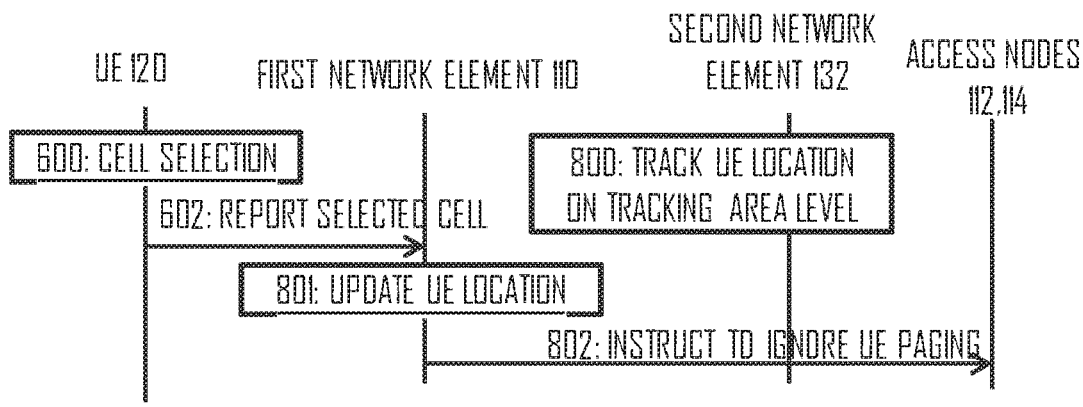
FIGS. 8 and 9 illustrate some embodiments for tracking the location of the terminal device in a cellular communication system.
Figure 9:
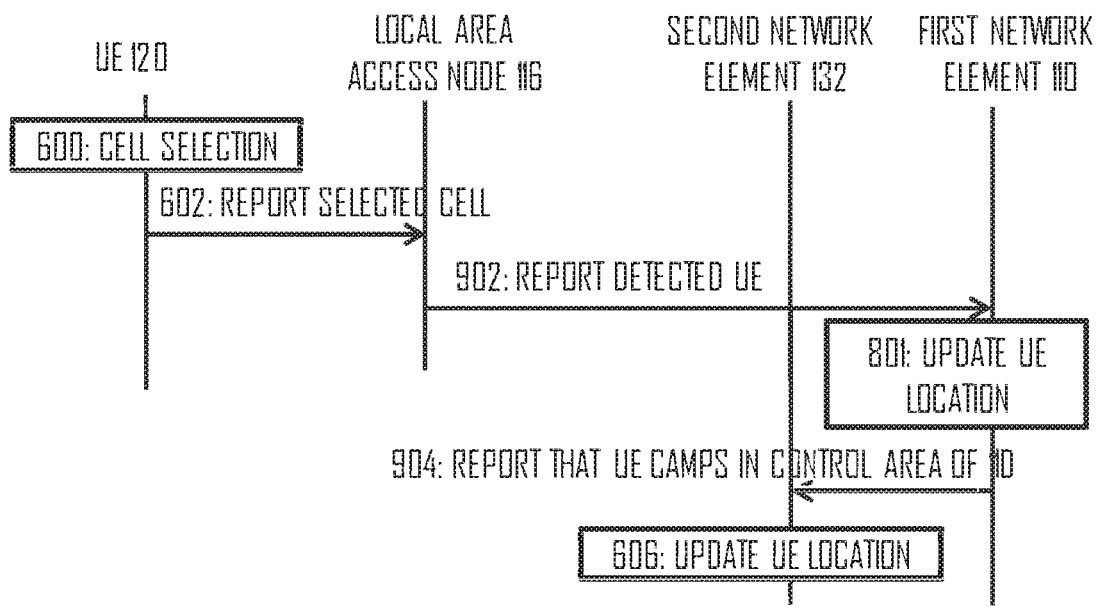

Another embodiment configuring the UE 120 to report the cell selection utilizes hierarchical tracking of the UE location. FIGS. 8 and 9 illustrate such embodiments. The second network element 132 may track the location of the UEs in the level of the tracking area comprising a multiple (macro) cells (block 800) while the access nodes 110 to 114, e.g. macro cell access nodes, may track the location of the UEs in their respective control areas. A control area of an access node may comprise one or more macro cells controlled by the access node and, in some embodiments any sub-cells located inside the macro cell(s) and provided by local area access node(s) controlled by the access node.

Referring to FIG. 8, the UE 120 may carry out the cell selection and reporting in steps 600, 602 in the above-described manner. Upon receiving the report from the UE 120 indicating that the UE 120 has selected a cell or a sub-cell controlled by the first network element 110, the first network element 110 may update the location of the UE 120 as the cell indicated in the report (block 801). Upon determining that the UE 120 has selected a cell or a sub-cell controlled by the first network element 110, the first network element 110 may send (step 802) a notification message to the other access nodes 112, 114 of the tracking area, e.g. via an X2 interface. The notification message may instruct the other access nodes 112, 114 of the tracking area to ignore paging requests paging for the UE 120. When this embodiment is used in connection with the process of FIG. 5, the second network element 132 may send the paging request (Step 504) to all access nodes 110 to 114 of the tracking area but only the access nodes other than the first network element 110 will ignore the paging request. The first network element 110 may follow the procedure of FIG. 5. If the first network element 110 cannot find the UE 120 in the paging process, it may inform the other access nodes 112, 114 of the tracking area not to ignore paging requests paging for the UE 120.

The process of FIG. 8 may be carried out between macro cell access nodes 110 to 114. As a consequence, if the UE 120 selects a sub-cell 106 of a macro cell 100, the eNB 110 controlling the macro cell 100 may still instruct the other macro cell access nodes 112, 114 to ignore the paging messages to the UE 120.

FIG. 9 illustrates an embodiment where the UE 120 selects a sub-cell. The UE 120 may carry out the cell selection and reporting in the above-described manner (steps 600, 602). The report is now sent in step 602 to the local area access node 116 (e.g. a sub-cell eNB, S-eNB) of the sub-cell 106. Upon receiving the report from the UE 120 in step 602, the local area access node 116 may report the cell selection by the UE 120 to the first network element 110 controlling the local area access node 116 (step 902). As a consequence, the first network element 110 becomes aware that the UE 120 has selected the sub-cell 106 and is camping in the sub-cell. The first network element 110 may then update the location of the UE to the sub-cell 106 (block 801). Then, the first network element 110 may report to the second network element 132 that the UE 120 has been detected in the control area of the first network element 110 (step 904). The report of step 904 may comprise an identifier of at least the first network element 110 but, in some embodiments, also an identifier of the local area access node 116. Upon receiving the report in step 904, the second network element may update the location of the UE 120 to the control area of the first network element 110 (block 606). The second network element may store, in association with an identifier of the UE 120, an identifier of the first network element and/or an identifier of the local area access node 116, depending on the embodiment. The embodiment of FIG. 9 also enables the faster proactive data forwarding of FIG. 7. If the UE 120 then selects another cell or sub-cell within the control area of the first network element 110, the first network element may refrain from sending a new report to the second network element 110. As a consequence, the second network element 130 may send the paging requests paging for the UE 120 to the first network element 110 and, if the UE 120 is located in a sub-cell, the first network element may forward the paging request to a local area access node controlling the sub-cell. If the first network element 110 reports the UE's 120 mobility within the control area and the second network element 132 stores the sub-cell where the UE 120 camps, the second network element 132 may transmit the paging requests of the UE 120 directly to the local area access node 116.

If the UE 120 does not respond to the paging requests within the control area, the first network element may request for the other access nodes 112 to 116 of the tracking area to page for the UE 120.

In yet another embodiment the first network element 110 tracks the location of the UE 120 according to the embodiment of FIG. 9 and the second network element 132 tracks the location of the UE 120 according to the embodiment of FIG. 8. Accordingly, step 904 is omitted.

Embodiments of FIGS. 8 and 9 illustrate hierarchical tracking of the UE 120 location where the first network element 110 carries out more accurate tracking of the UE 120 than the second network element 132.

Figure 10:
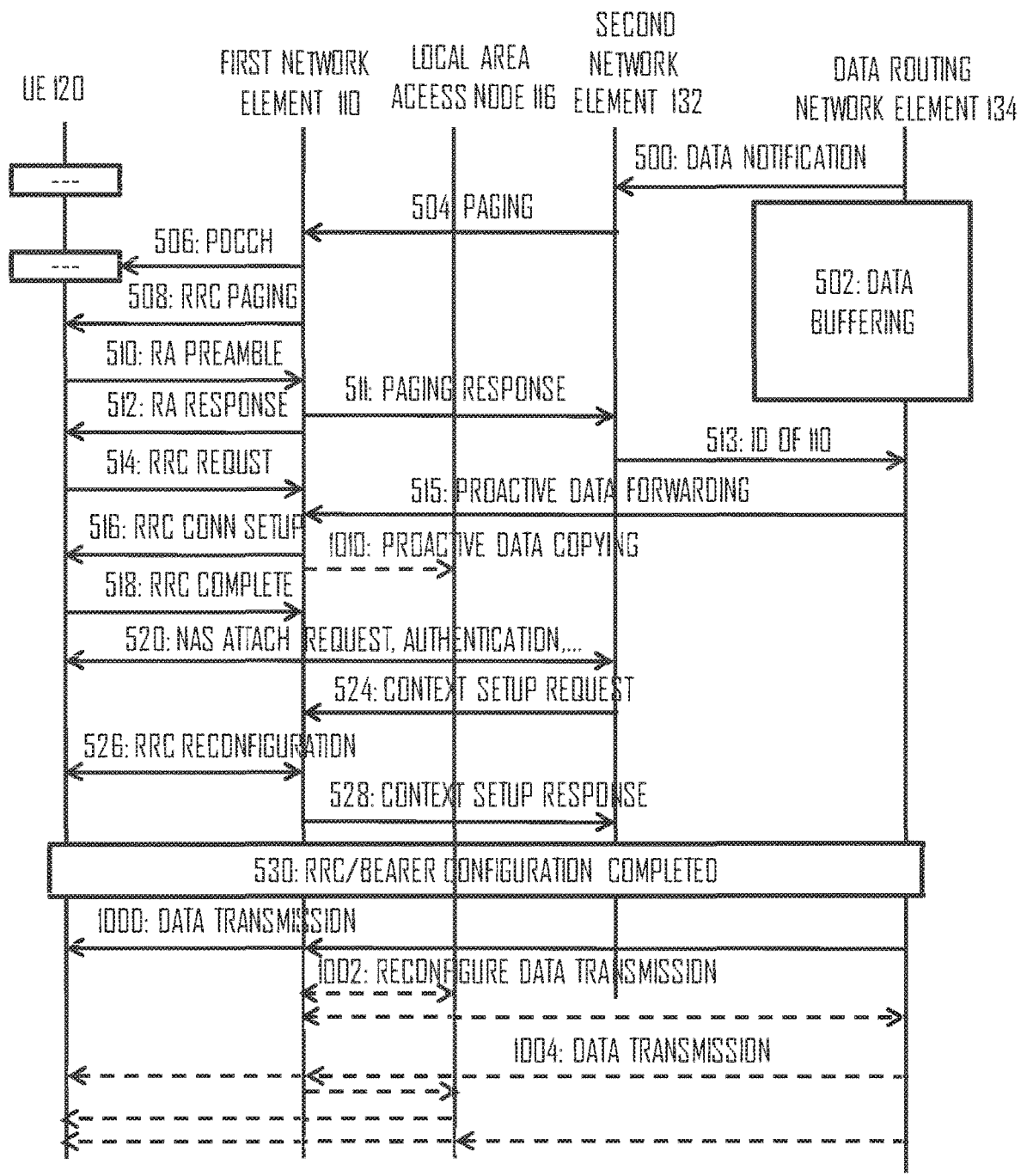
FIGS. 10 to 12 illustrate some embodiments for carrying out paging and data transmission in a system comprising a macro cell and a sub-cell.
Figure 11:
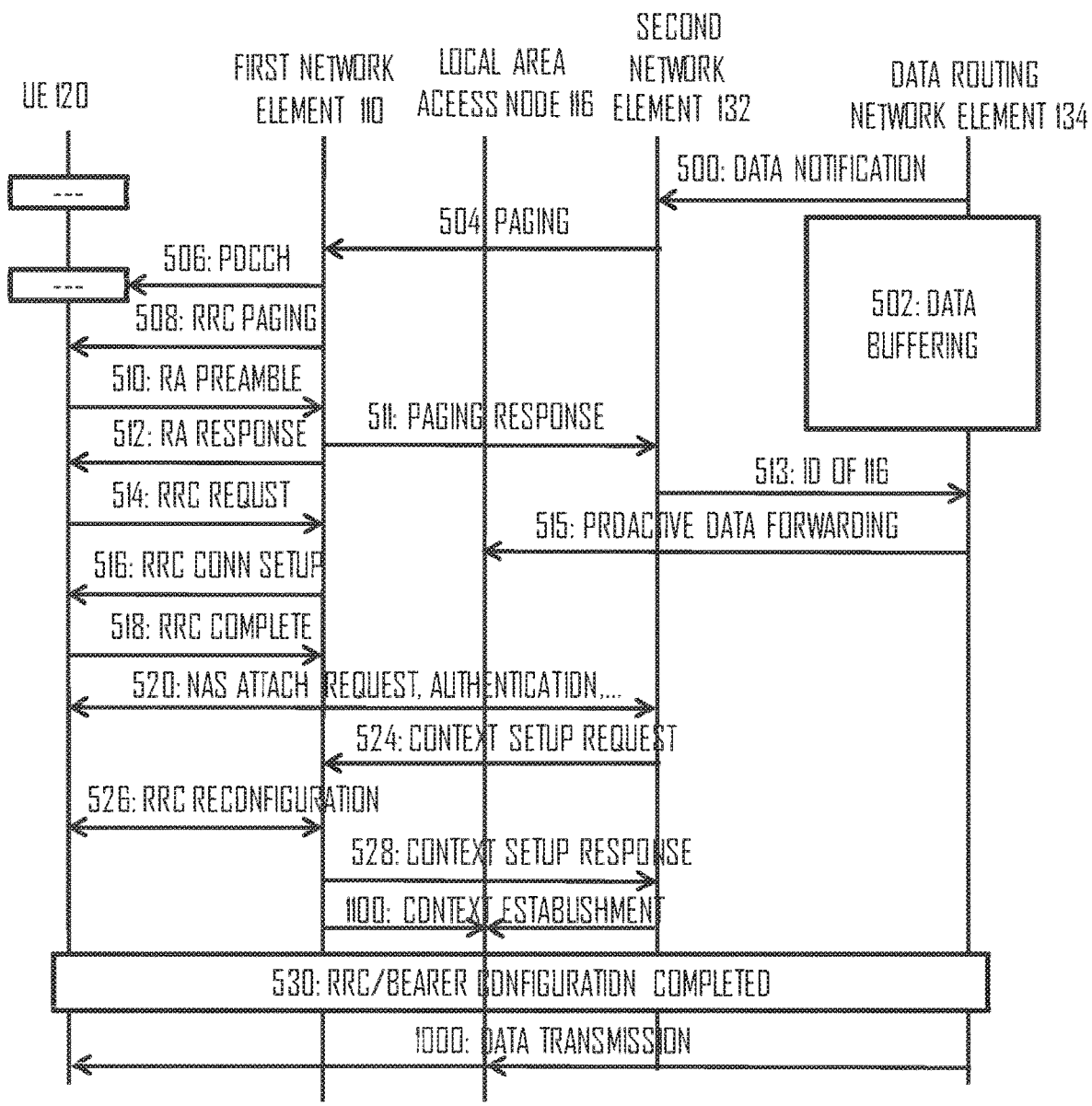
Figure 12:
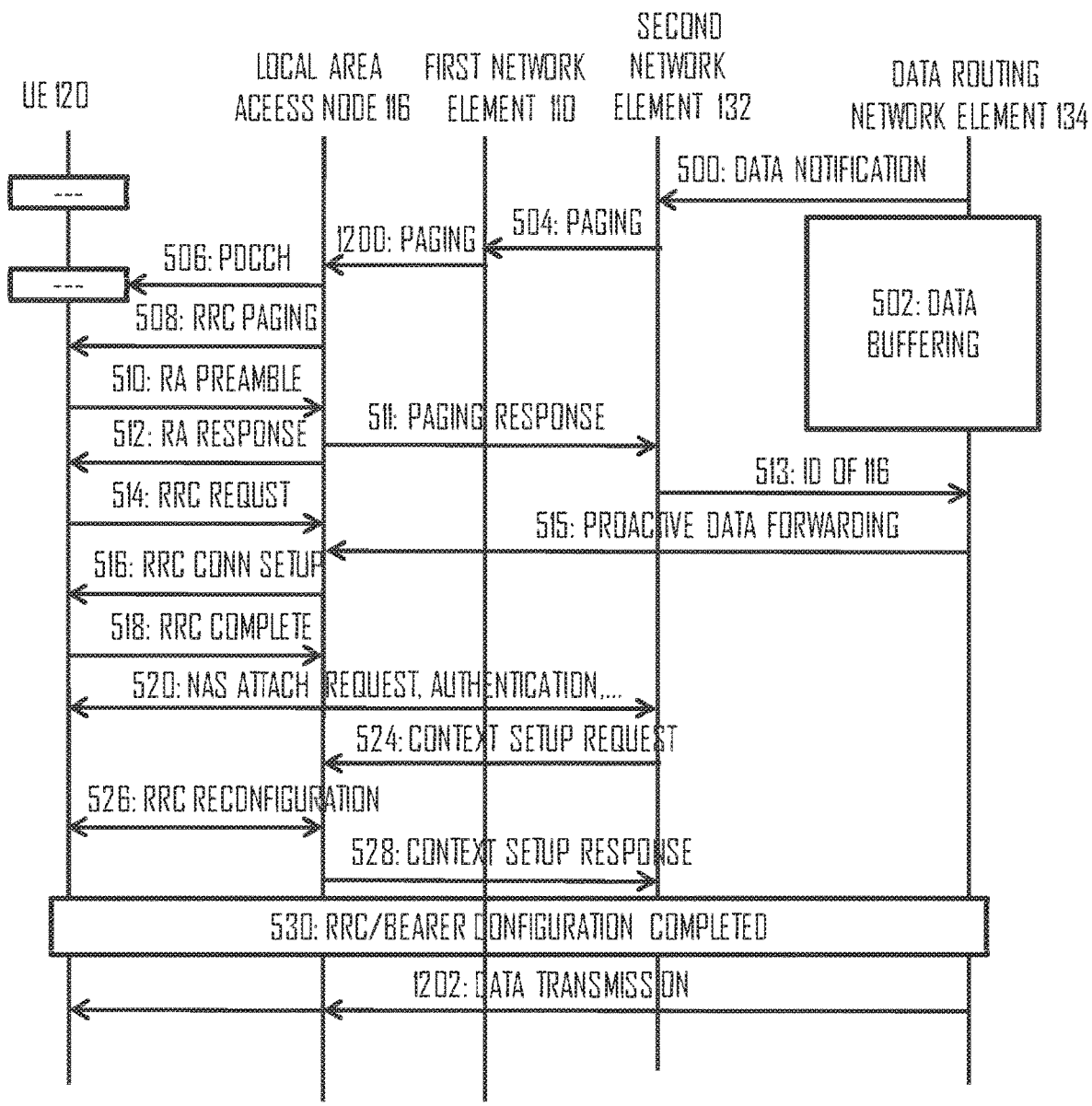

With respect to the scenario where at least one sub-cell 106 is provided within the control area comprising the macro cell 100, let us describe some embodiments for carrying out the paging and data transmission with reference to FIGS. 10 to 12. The first network element described above in connection with FIGS. 2 to 4 may be the local area access node 116 or a macro cell access node (eNB) 110, depending on the embodiment. In FIGS. 10 to 12, the steps or operations referred to the same reference numbers as in Figures described above refer to the same or substantially similar operations.

In the embodiment of FIG. 10, the macro cell access node such as the first network element 110 may perform the paging of the terminal device in the above-described manner. Accordingly, the operation of the first network element 110, second network element 132, and data routing network element 134 with respect to the paging may be similar to the embodiment of FIG. 5. On a more general level, the paging of the UE 120 may be carried out according to any specification. The proactive data forwarding in step 515 may be carried out between the data routing network element 134 and the first network element 110. After the RRC connection and bearer(s) have been configured for data transmission (block 530), the first network element 110 may start the downlink data transmission to the terminal device. Initial data transmissions to the UE 120 may comprise transmitting the downlink data transferred in step 515 from the first network element to the UE 120. Thereafter, downlink data may be routed from the data routing network element 134 to the UE 120 via the first network element 110 in block 1000.

Upon determining a determined event, the first network element 110 may decide to configure the local area access node 116 to carry out at least some of the data transmission. The event may be a traffic balancing event where the first network element decides to balance overall data traffic between cells of the control area. Another event may be a measurement event where the UE 120 may indicate that it is able, on the basis of for example channel measurements, to communicate with the local area access node 116 with a sufficient communication quality. Upon determining to reconfigure the connection with the UE 120, the first network element 110 may configure the local area access node to prepare for communicating with the UE 120 (step 1002). The configuration may comprise transmitting configuration parameters associated with the communication to the local area access node 116 and/or activating the configuration parameters in the local area access node 116. The parameters may comprise RRC connection parameters to establish a radio connection between the UE 120 and the local area access node, bearer service parameters to establish a logical connection between the local area access node 116 and the data routing network element 134, and/or security parameters such as encryption keys to be applied in the communication.

When the local area access node 116 has been configured and is ready for data transfer with the UE 120, the data routing network element 134 may start forwarding the downlink data to the UE 120 via the local area access node 116 (step 1004). Depending on the configuration, the downlink data transmission may be configured as a multi-point transmission where both the first network element 110 and local area access node 116 forwards the downlink data to the UE 120 or where only the local area access node 116 forwards the downlink data to the UE 120. Depending on the configuration, the downlink data may be forwarded from the data routing network element 134 to the first network element 110 and from the first network element 110 to the UE 120 through the local area access node 116 or from the data routing network element 134 to the UE 120 only through the local area access node 116 without routing it through the first network element 110.

In an embodiment, the first network element 110 makes preliminary preparations for the multi-point transmission during establishment of the service(s) for the data transmission to the terminal device 120. Such preliminary preparation may include transmitting (step 1010 in FIG. 10) the proactively forwarded data received by the first network element 110 in step 515 to one or more local area access nodes 116 controlled by the first network element. Accordingly, the downlink data may be buffered in a plurality of access nodes during the establishment of the service(s) such that the service(s) may be readily established as the multi-point service(s) where both access nodes 110, 116 transmit the data to the terminal device 120. Using location update procedure, the terminal device 120 may provide the first network element with information on the sub-cells located in the control area of the first network element. The information may comprise, for example, strongest received signal quality on different carrier frequencies. Table 1 below illustrates one embodiment of a report where the terminal device may indicate for each carrier frequency a cell that provides the strongest received signal quality as measured by the terminal device 120.

TABLE 1

| ID (UE) | f1       | f2       | f3       |
|---------|----------|----------|----------|
| GUTI1   | Cell ID #1 | Cell ID #2 | Cell ID #3 |

Referring to Table 1, the report may comprise an identifier of the terminal device and a cell identifier representing the cell providing the strongest received signal quality for each carrier frequency f1, f2, f3. The terminal device 120 may be camping only in one cell or sub-cell. When carrying out the location update towards a cell or a sub-cell with the strongest received signal quality on a given carrier frequency, the terminal device 120 may indicate in its location update request whether or not it is also camping in the cell or sub-cell.

Step 1010 may be carried out as soon as the first network element starts receiving the downlink data in step 515. The first network element 110 may inform the second network element 132 that the terminal device 120 is located in its control area. When applied to the embodiment of FIG. 7, upon receiving a data notification from the data routing network element 134, the second network element 132 may send (step 513) the identifier of the first network element 110 to the data routing network element 134 prior to receiving the paging response in step 511. When applied to the embodiment of FIG. 5, the second network element may send the identifier of the first network element 110 to the data routing network element upon receiving the paging response. The data routing network element 134 may then proactively forward data to the first network element 110. The first network element 110 may then further proactively forward a copy of the data to the local area access node 116 and other potential local area access nodes for dual-/multi-connectivity.

FIG. 11 illustrates an embodiment where the first network element 110 carries out the paging according to any one of the above-described embodiments. However, the first network element 110 may track the cell-level location of the UE 120 according to the embodiment of FIG. 9 and it may or may not carry out step 904. Let us assume a situation where the UE 116 has selected the macro cell of the first network element and the first network element 110 has further knowledge that UE is located within a coverage area of the local area access node 116 even though the local area access node 116 maybe in dormant state. The further knowledge may be deduced using the history of frequently associated local area access nodes to the terminal device 120. This embodiment may be applicable to a scenario where the local area access node 116 is in a dormant state. When downlink data is available for the UE 120 whose location is known by the first network element 110 at sub-cell level, the first network element may send a "WAKE-UP" message to the dormant local area access node 116 while simultaneously sending a paging message and initial data to the UE 120 through a macro cell. When the dormant local area access node is back in operational state and UE 120 has synchronized to it, the first network element 110 may initiate dual-/multi connectivity using protocol control elements, such as MAC/RLC/PDCP control elements and enhance the already on-going data transmission with multiple connections.

Upon receiving the paging request in step 504, the first network element 110 may determine, on the basis of the procedure of FIG. 9, that the UE 120 is located within the sub-cell 106 and transmit the identifier associated with the sub-cell 106 to the second network element 132. However, since the UE has selected the cell 100 to camp on, the first network element 110 may carry out the paging. In the embodiment of FIG. 11, the first network element 110 first pages for the UE 120 and, upon receiving the first communication from the terminal device, transmits the identifier of the local area access node in the paging response in step 511. The second network element 132 may then forward the identifier of the local area access node to the data routing network element 134 in step 513 and the data routing network element 134 may start the proactive data forwarding to the local area access node 116 in step 515.

In another embodiment, the first network element determines, on the basis of the cell-level location tracking of the UE 120 and the reception of the paging request in step 504, that the UE 120 is located in the sub-cell 106 and transmit the identifier of the local area access node 116 before receiving the first response to the paging from the UE 120. The first network element 110 may transmit the identifier of the local area access node in a message other than the paging response of step 511. Accordingly, the data routing network element 134 may start step 515 even earlier than in the embodiment of FIG. 11. The setup of the services between the first network element and the UE 120 and between the UE and the core network 130 may be carried out in the above-described manner in steps 514, 516 to 528. After establishment of the service, the service context may be transferred to the local area access node 16 in step 1100. The service context may comprise communication parameters necessary for the service(s) of the UE 120 for the data transmission. Upon establishing the service context in the local area access node 116 (after block 530), the data transmission from the data routing network element 134 to the UE 120 may be carried out through the local area access node.

In the embodiment of FIG. 11, the first network element may carry out paging and the setup of the services but all the data of the services may be routed through the local area access node. Accordingly, the eNB may carry out signaling on behalf of the local area access node.

FIG. 12 illustrates an embodiment where the local area access node 116 carries out the paging of the UE 120. The first network element 110 may track the cell-level location of the UE according to any one of the embodiments described above in connection with FIG. 11, e.g. according to the embodiment of FIG. 9. Upon receiving the paging request from the second network element 132 in step 504, the first network element may check whether or not the UE 120 is located in the control area of the first network element 110. If the UE 120 is determined to be in the control area, the first network element may determine the cell where the UE 120 is located. In an embodiment where the control area consists of one cell, the first network element may directly determine whether or not the UE 120 is located in the cell. If the UE 120 is determined to be in a sub-cell of the control area, the first network element 110 may forward the paging request to the local area access node 116 controlling the sub-cell 106. Thereafter, the local area access node may carry out the paging in a substantially similar manner as in FIG. 5 and send the paging response in step 511 to the second network element 132 directly or through the first network element 110. As a result, the identifier of the local area access node is forwarded to the data routing network element 132 and the proactive data forwarding to the local area access node may be started in step 515. The service(s) may be established in the local area access node in steps 514, 516 to 528 and, after the configuration of the services (block 530), downlink data may be routed from the data routing network element 134 to the UE 120 through the local area access node 116 without routing it through the first network element 110 (step 1202).

The reconfiguration of the services for multi-point data transmission according to steps 1000 to 1004 is applicable to this embodiment as well as to the embodiment of FIG. 11.

The embodiments described above provide many advantages. One advantage provided by the proactive data forwarding is the possibility to minimize latency between paging and initial data transmission. Described embodiments are suitable for small data bursts having a low-latency requirement. Low latency for initial data may be a significant benefit in MTC or internet-of-things (IoT) devices. Stationary MTC devices may be connected potentially to one or more small cells, but typically there is also macro coverage available. Therefore, it is possible to proactively forward the data at least to the first network element or a macro cell access node, which can page and has the initial data available for transmission after the paging response from UE 120. Embodiments also reduce a geographical tracking area where the UE 120 is paged, thus reducing paging signalling.

Above, it is described that the cell-level tracking of the location of the terminal device may be carried out by the terminal device reporting cell selection to an access node of a cell the terminal device has selected. The reporting may be carried out in a random access procedure. The random access procedure may comprise transmitting, by the terminal device, a Random Access Preamble (RAP) to the access node. The access node may respond with a Random Access Response (RAR) to the terminal device. The terminal device may transmit a first scheduled transmission to the access node based at least partly on the received RAP. The access node may respond with a contention resolution to the terminal device after receiving the first scheduled transmission. The random access procedure may be used, for example, to enable the terminal device to shift from RRC_Idle state to RRC_Connected state. This may enable the terminal device to transfer data with the radio communication network. For example, the terminal device may transmit data to the local area access node 116 or the macro cell access node 110.

Figure 13:
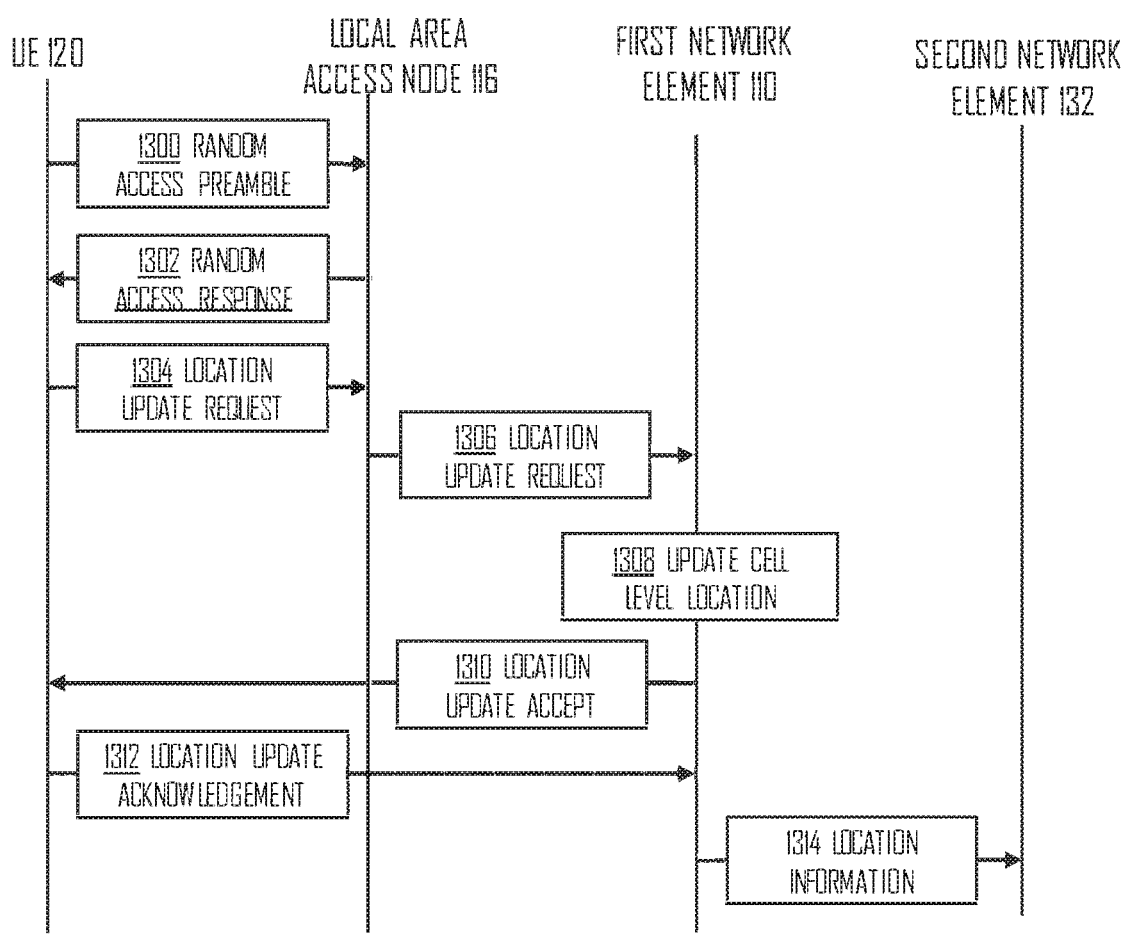
FIG. 13 illustrates a process for a terminal device to report cell selection through a random access process according to an embodiment of the invention.

Referring to FIG. 13, the location update process may be a part of a random access procedure between a terminal device and an access node. In block 1300, the terminal device 120 may transmit a RAP to the local area access node 116 of a sub-cell selected by the terminal device in an idle mode or in a non-connected mode, wherein the RAP may indicate the size of the location update request message that the terminal device 120 needs to transmit. The local area access node 116 may receive the RAP, and determine the amount of radio resources required for the uplink transmission of the location update request message. For example, the RAP may comprise an indicator, such as a one-bit indicator, indicating whether the radio resource required for the uplink transmission of the location update request message is large or small, similar to the RACH procedure in the LTE. Therefore, the determination, by the local area access node 116 that the RAP is transmitted with the purpose of indicating the cell level location of the terminal device, may be based on the content of the location update request message.

Referring to FIG. 13, the location update process may also be a part of a special random access procedure between a terminal device and a network element. In block 1300, the terminal device 120 may transmit a RAP to the local area access node 116 of a sub-cell selected by the terminal device in an idle mode or in a non-connected mode, wherein the RAP may indicate that the terminal device 120 wants to transmit the location update request. The local area access node 116 may receive the RAP, and determine that the purpose of the random access procedure and/or the transmitted RAP is for indicating the cell level location of the terminal device 120 using the location update request. For example, the RAP may comprise an indicator, such as a one-bit indicator, indicating that the radio resources are requested for the transmission of the location update request. Therefore, the determination, by the local area access node 116 that the RAP is transmitted for indicating the cell level location of the terminal device, may be based on the indicator comprised in the RAP, for example.

The local area access node 116 may transmit, to the terminal device 120, a RAR in response to the received RAP (block 1302). The terminal device 120 may receive the RAR. The RAR may comprise, for example, Timing Advance (TA), Cell Radio Network Temporary Identifier (C-RNTI) and/or an uplink scheduling grant. The RAR may comprise information about the allocation of radio resources to the terminal device 120 by the local area access node 116. Allocation information may be comprised in the uplink grant, for example. The allocated radio resources may be for transmitting, by the terminal device 120, the location update request. The terminal device 120 may become aware of the allocated radio resources based on the received RAR.

In an embodiment, the RAR may not comprise a TA parameter. The TA generally enables adjustment of uplink transmission timing of a terminal device such that an uplink transmission of the terminal device does not overlap with another uplink transmission in the access node. For example, in MTC scenario the distance between a local area access node and a terminal device may be so short that the TA is not required at all. This may optimize the data transfer as the amount of control data (i.e. TA value) may not be needed in the case where the location update is carried out towards a sub-cell with small enough radius that does not need TA.

In an embodiment, the terminal device 120 retransmits the RAP for as long as there is no response from the local area access node 116. The retransmitting may be stopped when the RAR is received by the terminal device 120.

In block 1304, the terminal device 120 may transmit the location update request to the local area access node 116 using the allocated radio resources. The location update request may comprise the terminal device identifier, such as a Globally Unique Temporary ID (GUTI). There may not necessarily be a response to the transmitted location update request. Thus, the terminal device 120 may not necessarily be aware has the radio communication network received the request and/or updated the location. Thus, the location update request may be referred also to as Best Effort tracking area update (BE-TAU), for example.

In block 1306, the local area access node 116 may transmit the location update request, received from the terminal device 120, to the first network element 110, e.g. the macro cell access node. In an embodiment, before transmitting the location update request to the first network element 110, the local area access node 116 adds a cell identifier of the sub-cell 106, controlled by the local area access node 116, to the location update request, and then transmits the location update request to the first network element 110. The local area access node 116 may be aware that the terminal device 120 has selected the sub-cell 106 and/or that the terminal device 120 is located within the area of the sub-cell 106. The location update request may be transmitted (block 1306) via X2 interface, for example.

In an embodiment, the terminal device 120 initiates a random access procedure towards the local area access node 116, wherein the sub-cell provided by the local area access node 116 may not be the primary camping cell of the terminal device 120. Thus, the terminal device 120 may select the sub-cell 106, as described above, wherein the cell 100 may be the primary camping cell.

In an embodiment, the terminal device 120 initiates a special random access procedure towards the local area access node 116, wherein the sub-cell provided by the local area access node 116 may not be the primary camping cell of the terminal device 120. Thus, the terminal device 120 may select the sub-cell 106, as described above, wherein the cell 100 may be the primary camping cell.

In block 1308, the first network element 110 updates the cell level location of the terminal device 120. For example, the sub-cell level location of the terminal device 120 is stored in a memory of the first network element 110, for example, using a list of GUTIs or S-TMSIs and their associated sub-cell identifiers. Further, the first network element 110 may associate GUTIs or S-TMSIs of the terminal devices, such as the terminal device 120, with the cell identifier of the macro cell 100.

In block 1314, the first network element 110 may transmit location information indicating the cell level location of the terminal device 110 to the second network element 132. Thus, the second network element 132 may be aware in which cell(s) the terminal device 120 is located in. For example, the second network element 132 may be aware, based on the received location information, that the terminal device 120 is within the sub-cell 106 and/or within the macro cell 100. The location information transmitted in block 1314 may be understood as a way to indicate to the second network element 132 that the terminal device 120 is associated with the first network element 110 and/or the local area access node 116. The second network element 132 may thus know accurately how to reach (e.g. in the paging process) the terminal device 120.

Still referring to FIG. 6B, in block 1310, the first network element 110 may, as a response to receiving the location update request (block 1306), transmit a location update accept to the terminal device 120, the location update accept indicating that the first network element 110 has at least received the location update request. In an embodiment, the location update accept indicates that the location update request has been accepted by the first network element 110. This may mean, for example, that the first network element 110 performs the update of block 1308 if it has accepted the location update request. In an embodiment, the first network element 110 transmits the location updated accept directly to the terminal device 120, e.g. if there is a connection established between the first network element 110 and the terminal device 120. In another embodiment, the location update accept is mediated through the local area access node 116.

As a response to transmitting the location update request (block 1304), the terminal device 120 may receive the location update accept (transmitted by the first network element 110 in block 1310), the location update accept indicating that the location update request was at least received by the first network element 110.

In block 1312, as a response to receiving the location update accept (block 1310), the terminal device 120 may transmit a location update acknowledgement to the first network element 110 and/or to the local area access node 116 (block 1312), wherein the location update acknowledgement may indicate that the location update accept was at least received by the terminal device 120.

In an embodiment, as a response to transmitting the location update accept (block 1310), the first network element 110 receives, from the terminal device 120, the location update acknowledgement indicating that the location update accept was received by the terminal device 120 (block 1312).

In an embodiment, the local area access node 116 receives, from the terminal device 120, the location update acknowledgement indicating that the location update accept was received by the terminal device 120, the location update accept indicating that the location update request was accepted by the first network element 110. The local area access node 116 may transmit and/or forward the received (e.g. received from the terminal device 120) location update acknowledgement to the first network element 110.

It needs to be understood that actions described in relation to blocks 1310, 1312 may not necessarily be performed. For example, the location update procedure (i.e. BE-TAU procedure) may be performed opportunistically. Thus, the location update request may be transmitted (block 1304) by the terminal device 120, wherein local area access node 116 may or may not receive the transmitted location update request. Thus, the network (e.g. local area access node 116 and/or the first network element 110) may not necessarily respond using the location update accept 1310 even though the location update request would have been received and further the request would have been granted. Naturally, in such case the location update acknowledgement may also be unnecessary to be transmitted.

Figure 14:
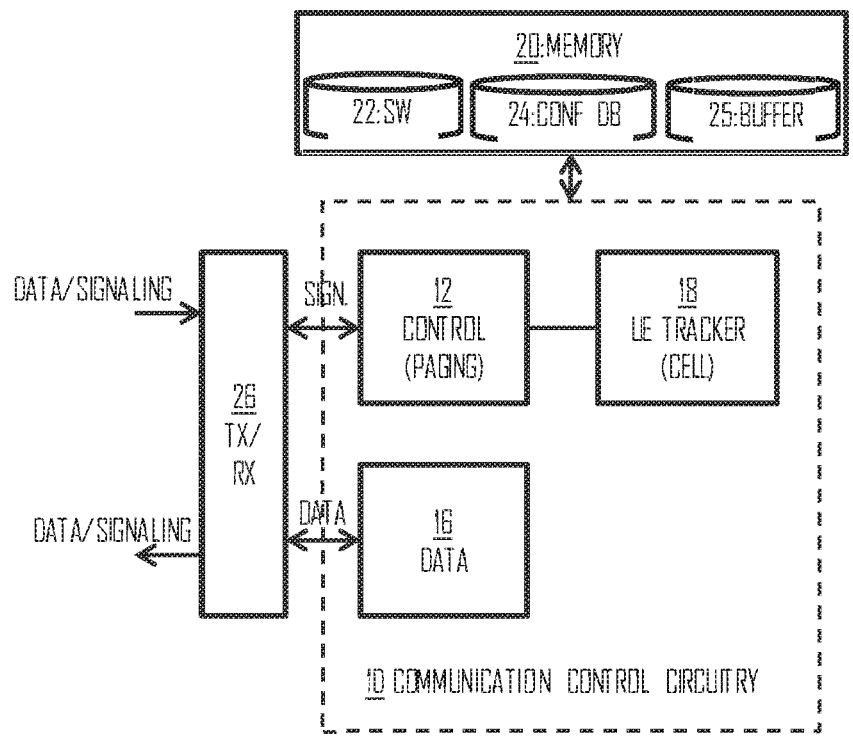
FIGS. 14 to 16 illustrate block diagrams of structures of apparatuses according to some embodiments of the invention.
Figure 15:
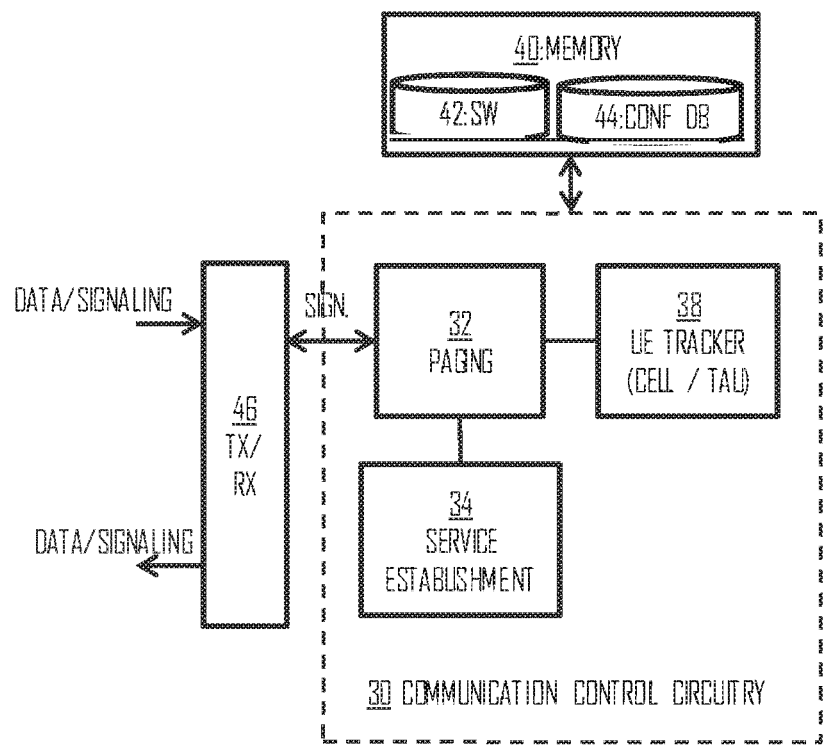
Figure 16:
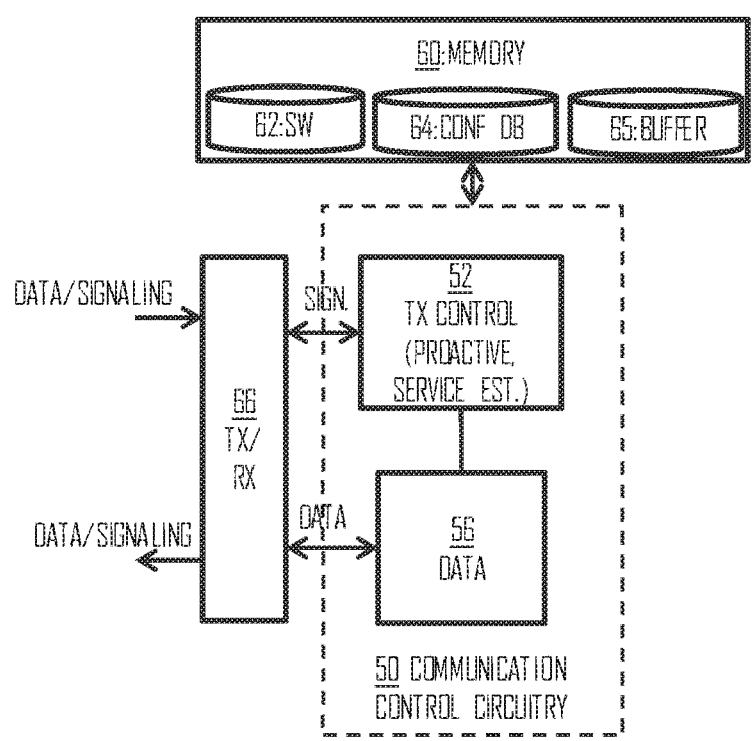

FIGS. 14 to 16 provide apparatuses according to some embodiments of the invention. FIG. 14 illustrates an apparatus configured to carry out the functions described above in connection with the first network element or the eNB 110. FIG. 15 illustrates an apparatus configured to carry out the functions described above in connection with the network element (FIG. 4) or the second network element 132. FIG. 16 illustrates an apparatus configured to carry out the functions described above in connection with the data routing network element or the data routing network element 134. Each apparatus may comprise a communication control circuitry 10, 30, 50, such as at least one processor, and at least one memory 20, 40, 60 including a computer program code (software) 22, 42, 62 wherein the at least one memory and the computer program code (software) are configured, with the at least one processor, to cause the respective apparatus to carry out any one of the embodiments of each apparatus described above.

The memories 20, 40, 60 may be implemented using any suitable data storage technology, such as semiconductor based memory devices, flash memory, magnetic memory devices and systems, optical memory devices and systems, fixed memory and removable memory. The memory may comprise a configuration database 24, 44, 64 for storing configuration data for services provided by the apparatus. For example, the configuration database 24 of the eNB 110 or the first network element may store configuration parameters for RRC connections established between terminal devices. The configuration databases 44, 64 may store configuration parameters for bearer services established with terminal devices.

The apparatuses may further comprise a communication interface (TX/RX) 26, 46, 66 comprising hardware and/or software for realizing communication connectivity according to one or more communication protocols. The communication interface may provide the apparatus with communication capabilities to communicate in the cellular communication system and enable communication between network nodes, and between the network node and terminal devices, for example. The communication interface may comprise standard well-known components such as an amplifier, filter, frequency-converter, (de)modulator, and encoder/decoder circuitries and one or more antennas. The communication interface 26 of the first network element may further comprise radio interface components providing the first network element with radio communication capability with terminal devices.

In an embodiment of FIG. 14, at least some of the functionalities of the first network element may be shared between two physically separate devices, forming one operational entity. Therefore, the apparatus may be seen to depict the operational entity comprising one or more physically separate devices for executing at least some of the described processes. Thus, the apparatus of FIG. 14, utilizing such a shared architecture, may comprise a remote control unit (RCU), such as a host computer or a server computer, operatively coupled (e.g. via a wireless or wired network) to a remote radio head (RRH) located in a base station site. In an embodiment, at least some of the described processes of the first network element or the eNB 110 may be performed by the RCU. In an embodiment, the execution of at least some of the described processes may be shared among the RRH and the RCU. In such a context, RCU may comprise the components illustrated in FIG. 14, and the communication interface 26 may provide the RCU with the connection to the RRH. The RRH may then comprise radio frequency signal processing circuitries and antennas, for example.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

The first network element (FIG. 14) and the data routing network element (FIG. 16) may carry out data routing and, therefore, the respective memories 20, 60 may comprise a data buffer 25, 65 for temporary storage of data associated with one or more terminal devices. The apparatuses may also comprise, as a sub-circuitry of the communication control circuitries 10, 50, a data transmission control circuitry 16, 56 carrying out the data transmission/reception in the cellular communication system.

Referring to FIG. 14, the apparatus may comprise a control circuitry 12 carrying out control plane signalling with terminal devices, other access nodes of the radio access network, and with network elements of the core network 130. The control circuitry 12 may carry out steps 504 to 512 and 514 to 530 in the first network element. The control circuitry may also carry out signalling related to steps 602, 604, 802, 902, and 904, for example.

The apparatus may further comprise a UE tracker circuitry 18 configured to track locations of terminal devices within the control area of the first network element. Accordingly, the UE tracker circuitry 18 may maintain cell-level location information on terminal devices that have selected a cell of the control area.

Referring to FIG. 15, the apparatus may comprise a paging circuitry 32 configured to page for a terminal device upon detecting that there is downlink data to be transmitted to the terminal device or upon receiving a connection request for the terminal device. The apparatus may further comprise a service establishment circuitry 34 configured to establish a service for the terminal device upon successful paging or upon the terminal device requesting for the service. The service may comprise a bearer service specifying a connection between the terminal device and a core network, for example.

The apparatus may further comprise a UE tracker circuitry 38 configured to track locations of terminal devices within a tracking area. In an embodiment, the UE tracker circuitry 38 associates each terminal device with a tracking area comprising a plurality of macro cells. In another embodiment, the UE tracker circuitry 38 associates each terminal device with a macro cell, thus maintaining cell-level location of the terminal devices.

Referring to FIG. 16, the apparatus may comprise a data transmission control circuitry 52 controlling a data transmission circuitry 56 to transmit data in the cellular communication system. Upon receiving downlink data for the terminal device, the data may be buffered in the buffer 65 and the data transmission control circuitry may trigger a paging process by transmitting the notification to another element of the cellular communication system, e.g. the second network element 132. The data transmission control circuitry may also query for the current location of the terminal device in the above-described manner. Upon receiving an identifier of a cell or a network element currently selected by the terminal device, the data transmission control circuitry may control the data transmission circuitry 56 to start proactive transmission of the data to the network element controlling the cell. Meanwhile, the data transmission control circuitry may carry out establishment of a service for the transmission of the downlink data.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 13 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 13 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 13 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. An apparatus comprising:
   at least one processor, and
   at least one memory comprising a computer program code, wherein the processor, the memory, and the computer program code are configured to cause the apparatus to:
   detect, in a network element of a cellular communication system, that downlink data addressed to a terminal device of the cellular communication system exists;
   in response to said detecting, determine a cell where the terminal device is located, and
   upon determining the cell, transmit a notification message to a data routing network element of the cellular communication system, wherein the notification message comprises an identifier associated with the determined cell and is transmitted before a bearer service associated with said downlink data has been fully configured between the network element and the terminal device.

2. The apparatus of claim 1, wherein the processor, the memory, and the computer program code are further configured to cause the apparatus to:
store the identifier in a location database, and
transmit a paging message only to an access node operating the cell in which the terminal device is located.

3. The apparatus of claim 1, wherein the processor, the memory, and the computer program code are further configured to cause the apparatus to:
store the identifier in a location database;
in response to said detecting, transmit a paging message only to an access node operating the cell in which the terminal device is located, and
transmit, upon unsuccessful paging of the terminal device in the cell, a paging request in a tracking area comprising a plurality of cells.

4. The apparatus of claim 1, wherein the notification message is transmitted to the data routing network element before receiving a response to a paging message paging the terminal device.

5. A method comprising:
detecting, in a network element of a cellular communication system, that downlink data addressed to a terminal device of the cellular communication system exists;
in response to said detecting, determining in the network element a cell where the terminal device is located; and
upon determining the cell, causing in the network element transmission of a notification message to a data routing network element of the cellular communication system, wherein the notification message comprises an identifier associated with the determined cell and is transmitted before a bearer service associated with said downlink data has been fully configured between the network element and the terminal device.

6. The method of claim 5, further comprising in the network element:
storing, in a location database, an identifier of a cell in which the terminal device is currently located; and
in the response to said detecting, causing transmission of a paging message only to an access node operating the cell in which the terminal device is currently located.

7. The method of claim 6, wherein said cell is a macro cell operated by a macro cell access node controlling also at least one sub-cell operated by a local area access node, wherein the at least one sub-cell is located within the macro cell, and wherein the paging message is transmitted to the macro cell access node.

8. The method of claim 6, further comprising in the network element upon unsuccessful paging of the terminal device in the cell: causing transmission of a paging request in a tracking area comprising a plurality of cells.

9. The method of claim 6, wherein the notification message is transmitted to the data routing network element before receiving a response to the paging message.

10. The method of claim 5, further comprising in the network element:
storing, in a location database, an identifier of a tracking area in which the terminal device is currently located, wherein the tracking area comprises a plurality of cells; and
in the response to said detecting, causing transmission of a paging message to a plurality of access nodes operating in the tracking area.

11. The method of claim 10, wherein the cell in which the terminal device is currently located is determined on the basis of one or more responses to the paging request.

12. The method of claim 10, further comprising causing transmission of the notification message upon receiving a response to the paging message.

* * * * *